UNITED STATES PATENT OFFICE.

WILHELM KRAUTH, OF GRIESHEIM, GERMANY.

PROCESS OF MAKING ALLO CITRAL.

SPECIFICATION forming part of Letters Patent No. 654,649, dated July 31, 1900.

Application filed November 23, 1899. Serial No. 738,091. (No specimens.)

*To all whom it may concern:*

Be it known that I, WILHELM KRAUTH, a subject of the King of Prussia, German Empire, residing at Griesheim-on-the-Main, Germany, have invented certain new and useful Improvements in Processes for the Preparation of 2.6 Dimethyl, 2.5 Octdienal 8, (for which I have applied for a patent in Germany, dated February 3, 1899,) of which the following is a specification.

Although, according to theory, numerous isomeric alipathic aldehydes of the terpene series having the formula $C_{10}H_{16}O$ should be possible, one alone—namely, citral, (gernial,)—is known. The constitution of citral has been settled by the work of Tiemann, Semmler, Barbier, Verley, and others by analysis of the citral molecule, which may be split up first into acetaldehyde and methylhexylenketone and then, by further decomposition of the latter, into acetone and levulinic acid, so that the formula

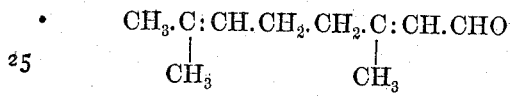

may be deduced. Furthermore, the work of Tiemann and of Döbner shows that Stiehl's assertion that three aldehydes may be isolated from lemon-grass oil, which differ from each other by the position of their double bonds, arises from faulty observation. I have succeeded now in preparing synthetically an aliphatic aldehyde of the formula $C_{10}H_{16}O$ which differs from citral and whose constitution follows directly from its mode of formation. I have found, in fact, that when methylhexylenketone of the formula:

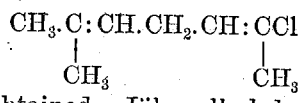

is mixed with phosphorus penta-chlorid, both substances being kept well cooled, its oxygen is exchanged for chlorin, and it is converted into dichlorooctene

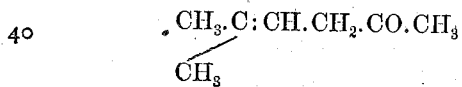

from which, by elimination of hydrogen, chlorid chloro octene

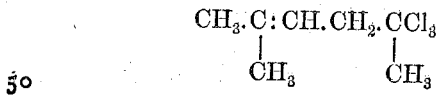

may be obtained. Like alkyl halides this may be caused to react with ethyl sodiomalonate, whereby there is formed, with elimination of sodium chlorid, octinyl malonic-acid diethylester. By saponification there is obtained from this the free dimethyl octinyl malonic acid, from which carbon dioxid is eliminated by distillation in a vacuum, octinyl acetic acid, named by myself "allo geranic" acid, an isomeride of geranic acid, being formed. These isomerides differ by the position of a double bond in the molecule, as is shown by the following formulæ:

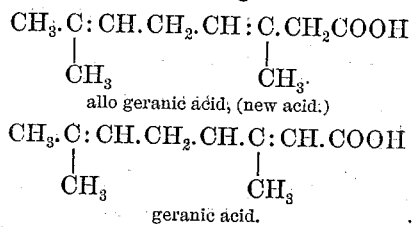

allo geranic acid, (new acid.)

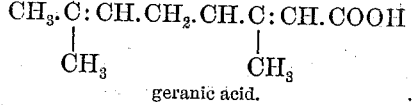

geranic acid.

When a dry mixture of equivalent quantities of octinyl acetate of barium and barium formate is distilled in a vacuum, a good yield is obtained of allo citral, the aldehyde corresponding with allo geranic acid and isomeric with citral. Its formula is

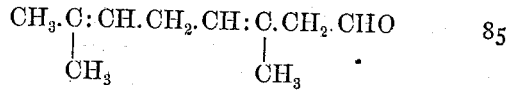

This aldehyde may be obtained also, although in small yield, by the dry distillation of a mixture of the barium salt of octinyl malonic acid with barium formate.

The following examples illustrate the operations.

Example 1: One hundred and twenty-five parts of methylhexylenketone are allowed to drop slowly upon two hundred and ten parts of phosphorus penta-chlorid. When all has been added, the mixture is heated on the water-bath until the development of hydrogen chlorid has ceased. The phosphorus oxychlorid is then decomposed by addition of water, and the chloro octin is distilled over with steam. It is thus obtained sufficiently pure for the subsequent operations.

Example 2: One hundred and forty-five parts of chloro octin are heated in alcoholic solution with one hundred and eighty-two parts of ethyl sodiomalonate in reflux apparatus until, after two or three hours, the reaction of the liquid is neutral. After the alcohol has been distilled off water is added and the octinyl malonic acid diethylester is separated from the aqueous solution of sodium chlorid. By saponifying by known methods there is obtained from this ester the free octinyl malonic acid.

Example 3: The last-named acid is slowly distilled in a vacuum in an oil-bath. Carbon dioxid is evolved and the octinyl-acetic acid, named "allo geranic" acid, is obtained as the distillate.

Example 4: An intimate mixture of forty-seven parts of dry barium salt and 22.5 parts of dry barium formate is distilled in a vacuum. A good yield of allo-citral is obtained.

Example 5: For the preparation of this aldehyde from octinyl malonic acid thirty-five parts of the dry barium salt of this acid are mixed with twenty-five parts of dry barium formate, and the mixture is distillated as described in Example 4.

The new aldehyde (allo-citral) is applicable for the manufacture of perfumes.

What I claim, and desire to secure by Letters Patent of the United States, is—

A process for the preparation of allo citral by first converting methylhexylenketone into chloro octin then converting the latter by means of ethyl sodiomalonate into octinyl malonic acid diethylester, then saponifying this ester to obtain the free acid, and finally distilling a dry mixture of the barium salt of this octinyl malonic acid obtained by eliminating carbon dioxid from this aforesaid acid, with barium formate, substantially as described.

In testimony whereof I have hereunto set my hand in the presence of two witnesses.

WILHELM KRAUTH.

Witnesses:
 RICHARD GUENTHER,
 CARL GRUND.